(12) United States Patent
Morten et al.

(10) Patent No.: US 7,299,292 B2
(45) Date of Patent: *Nov. 20, 2007

(54) PROCESS AND STREAMING SERVER FOR ENCRYPTING A DATA STREAM TO A VIRTUAL SMART CARD CLIENT SYSTEM

(75) Inventors: Glenn A. Morten, Bellevue, WA (US); Brian Baker, Bellevue, WA (US)

(73) Assignee: Widevine Technologies, Inc., Seattle, WA (US)

( * ) Notice: Subject to any disclaimer, the term of this patent is extended or adjusted under 35 U.S.C. 154(b) by 503 days.

This patent is subject to a terminal disclaimer.

(21) Appl. No.: 10/957,081

(22) Filed: Oct. 1, 2004

(65) Prior Publication Data

US 2005/0120125 A1 Jun. 2, 2005

Related U.S. Application Data

(63) Continuation-in-part of application No. 10/109,963, filed on Mar. 29, 2002, now Pat. No. 6,965,993.

(51) Int. Cl.
*G06F 15/16* (2006.01)
*G06F 7/04* (2006.01)

(52) U.S. Cl. ........................................ 709/231; 726/20

(58) Field of Classification Search ................ 709/231, 709/232, 229; 713/159, 168, 170, 182, 185; 726/2, 20, 3; 725/87, 91
See application file for complete search history.

(56) References Cited

U.S. PATENT DOCUMENTS

| 4,694,489 A | 9/1987 | Frederiksen |
| 5,067,035 A | 11/1991 | Kudelski et al. |
| 5,134,656 A | 7/1992 | Kudelski |
| 5,144,663 A | 9/1992 | Kudelski et al. |
| 5,339,413 A | 8/1994 | Koval et al. |
| 5,375,168 A | 12/1994 | Kudelski |
| 5,487,167 A | 1/1996 | Dinallo et al. |
| 5,539,450 A | 7/1996 | Handelman |

(Continued)

FOREIGN PATENT DOCUMENTS

EP 658054 B1 6/1995

(Continued)

OTHER PUBLICATIONS http://www.ntt.co.jp/news/news02e/0209/020927.html, Sep. 27, 2002.

(Continued)

*Primary Examiner*—William Vaughn
*Assistant Examiner*—Yemane M Gerezgiher
(74) *Attorney, Agent, or Firm*—Darby & Darby PC; Jamie L. Wiegand (57) ABSTRACT

There is disclosed a process for encrypting a data stream to secure the data stream for single viewing and to protect copyrights of the data stream. Specifically, there is disclosed a process for protecting streaming multimedia, entertainment and communications in a network transmission. There is further disclosed a streaming server component operably connected with a streaming server that interacts with a client system that includes a virtual smart card to effect the inventive process.

27 Claims, 7 Drawing Sheets

U.S. PATENT DOCUMENTS

| | | |
|---|---|---|
| 5,590,200 A | 12/1996 | Nachman et al. |
| 5,592,212 A | 1/1997 | Handelman |
| 5,621,799 A | 4/1997 | Katta et al. |
| 5,640,546 A | 6/1997 | Gopinath et al. |
| 5,666,412 A | 9/1997 | Handelman et al. |
| 5,684,876 A | 11/1997 | Pinder et al. |
| 5,758,257 A | 5/1998 | Herz et al. |
| 5,774,527 A | 6/1998 | Handelman et al. |
| 5,774,546 A | 6/1998 | Handelman et al. |
| 5,799,089 A | 8/1998 | Kuhn et al. |
| 5,805,705 A | 9/1998 | Gray et al. |
| 5,878,134 A | 3/1999 | Handelman et al. |
| 5,883,957 A | 3/1999 | Moline et al. |
| 5,892,900 A | 4/1999 | Ginter et al. |
| 5,910,987 A | 6/1999 | Ginter et al. |
| 5,915,019 A | 6/1999 | Ginter et al. |
| 5,917,912 A | 6/1999 | Ginter et al. |
| 5,920,625 A | 7/1999 | Davies |
| 5,920,861 A | 7/1999 | Hall et al. |
| 5,922,208 A | 7/1999 | Demmers |
| 5,923,666 A | 7/1999 | Gledhill et al. |
| 5,933,498 A | 8/1999 | Schneck et al. |
| 5,939,975 A | 8/1999 | Tsuria et al. |
| 5,943,422 A | 8/1999 | Van Wie et al. |
| 5,949,876 A | 9/1999 | Ginter et al. |
| 5,982,891 A | 11/1999 | Ginter et al. |
| 6,009,116 A | 12/1999 | Bednarek et al. |
| 6,009,401 A | 12/1999 | Horstmann |
| 6,009,525 A | 12/1999 | Horstmann |
| 6,021,197 A | 2/2000 | von Willich et al. |
| 6,035,037 A | 3/2000 | Chaney |
| 6,038,433 A | 3/2000 | Vegt |
| 6,049,671 A | 4/2000 | Slivka et al. |
| 6,055,503 A | 4/2000 | Horstmann |
| 6,073,256 A | 6/2000 | Sesma |
| 6,112,181 A | 8/2000 | Shear et al. |
| 6,138,119 A | 10/2000 | Hall et al. |
| 6,157,721 A | 12/2000 | Shear et al. |
| 6,178,242 B1 | 1/2001 | Tsuria |
| 6,185,683 B1 | 2/2001 | Ginter et al. |
| 6,189,097 B1 | 2/2001 | Tycksen, Jr. et al. |
| 6,191,782 B1 | 2/2001 | Mori et al. |
| 6,226,794 B1 | 5/2001 | Anderson, Jr. et al. |
| 6,237,786 B1 | 5/2001 | Ginter et al. |
| 6,240,185 B1 | 5/2001 | Van Wie et al. |
| 6,247,950 B1 | 6/2001 | Hallam et al. |
| 6,253,193 B1 | 6/2001 | Ginter et al. |
| 6,256,668 B1 | 7/2001 | Slivka et al. |
| 6,272,636 B1 | 8/2001 | Neville et al. |
| 6,285,985 B1 | 9/2001 | Horstmann |
| 6,292,569 B1 | 9/2001 | Shear et al. |
| 6,298,441 B1 | 10/2001 | Handelmann et al. |
| 6,311,221 B1 | 10/2001 | Raz et al. |
| 6,314,409 B2 | 11/2001 | Schneck et al. |
| 6,314,572 B1 | 11/2001 | LaRocca et al. |
| 6,334,213 B1 | 12/2001 | Li |
| 6,363,488 B1 | 3/2002 | Ginter et al. |
| 6,389,402 B1 | 5/2002 | Ginter et al. |
| 6,405,369 B1 | 6/2002 | Tsuria |
| 6,409,080 B2 | 6/2002 | Kawagishi |
| 6,409,089 B1 | 6/2002 | Eskicioglu |
| 6,415,031 B1 | 7/2002 | Colligan et al. |
| 6,427,140 B1 | 7/2002 | Ginter et al. |
| 6,449,367 B2 | 9/2002 | Van Wie et al. |
| 6,449,719 B1 | 9/2002 | Baker |
| 6,459,427 B1 | 10/2002 | Mao et al. |
| 6,466,670 B1 | 10/2002 | Tsuria et al. |
| 6,505,299 B1 | 1/2003 | Zeng et al. |
| 6,516,357 B1 | 2/2003 | Hamann et al. |
| 6,587,561 B1 | 7/2003 | Sered et al. |
| 6,618,484 B1 | 9/2003 | Van Wie et al. |
| 6,629,243 B1 | 9/2003 | Kleinman et al. |
| 6,633,918 B2 | 10/2003 | Agarwal et al. |
| 6,634,028 B2 | 10/2003 | Handelmann |
| 6,640,304 B2 | 10/2003 | Ginter et al. |
| 6,651,170 B1 | 11/2003 | Rix |
| 6,654,420 B1 | 11/2003 | Snook |
| 6,654,423 B2 | 11/2003 | Jeong et al. |
| 6,658,568 B1 | 12/2003 | Ginter et al. |
| 6,668,325 B1 | 12/2003 | Collberg et al. |
| 6,729,549 B2* | 5/2004 | Hamann et al. ............ 235/492 |
| 6,941,285 B2* | 9/2005 | Sarcanin ...................... 705/67 |
| 7,085,931 B1* | 8/2006 | Smith et al. ................ 713/182 |
| 2001/0008015 A1* | 7/2001 | Vu et al. .................... 713/189 |
| 2002/0108037 A1 | 8/2002 | Baker |
| 2003/0007568 A1 | 1/2003 | Hamery et al. |
| 2004/0117500 A1 | 6/2004 | Lindholm et al. |
| 2004/0151315 A1* | 8/2004 | Kim .......................... 380/241 |

FOREIGN PATENT DOCUMENTS

| | | |
|---|---|---|
| EP | 714204 B1 | 5/1996 |
| EP | 0 852 445 A2 | 7/1998 |
| EP | 182875 A2 | 2/2002 |
| JP | 2001-144802 | 5/2001 |
| JP | 2002-084339 | 3/2002 |
| JP | 2004-048772 | 2/2004 |
| WO | WO-96/06504 A1 | 2/1996 |
| WO | WO-96/32702 A1 | 10/1996 |
| WO | WO-99/21364 | 4/1999 |
| WO | WO-99/28842 | 6/1999 |
| WO | WO-99/30499 A1 | 6/1999 |
| WO | WO-99/54453 A1 | 10/1999 |
| WO | WO-01/35571 A1 | 5/2001 |
| WO | WO-02/21761 A2 | 3/2002 |
| WO | WO-02/084980 | 10/2002 |
| WO | WO-03/092264 | 11/2003 |
| WO | WO-2004/002112 A1 | 12/2003 |

OTHER PUBLICATIONS

Coverage and Generalization in an Artificial Immune System, Balthrop, et al., 2002.
Video Protection by Partial Content Corruption, C. Griwodz, Sep. 1998.
An Overview of Multimedia Content Protection in Consumer Electronics Devices, Eskicioglu et al.
Performance Study of a Selective Encryption Scheme for the Security of Networked, Real-Time Video, Spanos et al., 1995.
Goonatilake, Suran, ed. et al., Intelligent Systems for Finance and Business, 1995, chapters 2-10, pp. 31-173.
Irdeto Access and Optibase create Strategic Alliance—Dec. 14, 2000, http://www.irdetoaccess.com/press/0000041.htm.
System Security, Streaming Media, S. Blumenfeld, Oct. 2001.
http://www.cs.unm.edu/~forest/projects.html, Dec. 2, 2003.
Partial Encryption for Image and Video Communication, H. Cheng, 1998.
A Review of Video Streaming Over the Internet, Hunter et al., Dec. 2, 2003.
Standards Track, Schulzrinne, et al., Apr. 1998, pp. 1-86.
http://www.optibase.com/html/news/December_14_2000.html, Dec. 14, 2004.
Omneon Video Networks Product Announcement, Broadband Streaming, pp. 1-4.
Yoshida, Kazuhiro, et al., "A Continuous-media Communication Method for Minimizing Playback Interruptions", IS&T/SPIE Conference on Visual Communications and Immage Processing, Jan. 1999, San Jose, California, vol. 3653.
Andrew Hanushevsky and Robert Cowles, "Virtual Smart Card", Stanford Linear Accelerator Center, Dec. 13, 2002, pp. 1-12.
"Taking a DIFFERENT path" "The application of virtual smart card technology to interactive TV", Communications Engineering & Desing, Aug. 2003, can be found at http://testced.cahners1.com/ced/2003/0803/08b.htm, pp. 1-5.

Griwodz, Carsten et al., "Protecting VoD the Easier Way", ACM Multimedia, 1998, Bristol, UK, pp. 21-28.

Schulzrinne, H., et al., "RTP: A Transport Protocol for Real-Time Applications", RFC 1889, Jan. 1996, pp. 1-75.

International Search Report dated Oct. 12, 2005.

European Patent Office, Communication dated Jan. 26, 2006 for EP Application No. 05250968.4.

Communication pursuant to Article 96(2) EPC dated Dec. 6, 2006 corresponding to EP Application No. 00986215.2 filed Nov. 9, 2000.

International Search Report & Written Opinion dated May 24, 2007, for corresponding PCT Application No. PCT/US05/31353, filed Sep. 1, 2005.

* cited by examiner

PROCESS AND STREAMING SERVER FOR ENCRYPTING A DATA STREAM TO A VIRTUAL SMART CARD CLIENT SYSTEM

RELATED APPLICATIONS

This is a continuation in part of U.S. patent application Ser. No. 10/109,963, entitled "Process and Streaming Server for Encrypting a Data Stream," filed Mar. 29, 2002, now U.S. Pat. No. 6,965,993 under 35 U.S.C. §120 and 37 C.F.R. §1.53(b), which is incorporated herein by reference.

TECHNICAL FIELD OF THE INVENTION

The present invention provides a process for encrypting a data stream to secure the data stream for single viewing and to protect copyrights of the data stream. Specifically, the invention provides a process for protecting streaming multimedia, entertainment, and communications in a network transmission. The invention further provides a virtual smart card within a client system that interacts with a streaming server component to effect the inventive process.

BACKGROUND OF THE INVENTION

The Internet has provided another means for communication whereby data can be streamed from a server to a client. The client is responsible for displaying the streamed data, preferably streamed media, to a user. The server is responsible for delivering the data stream to the client. The Real Networks and Microsoft solutions send the data stream via a UDP (a connectionless Internet protocol) along with another connection between the client and the server that controls the transmission of the streamed data. The control connection element functions to stop buffer overruns and can adjust the transmission of the stream to compensate for bandwidth latencies. One problem with this arrangement, however, is that the data that are streamed to the client from the server are unprotected and available to anyone on the network. Therefore, there is a need in the art to better protect from interception across a wide area network, such as the Internet. Specifically, the need relates to providing an ability to protect the improper interception and ability to copy streaming data across the Internet. At present, there is no protection mechanism in place to protect copyrighted data.

Once the data has been released by the server and either received by the user or intercepted before being received by the user, there is no way to restrict the re-transmission of such data once it has been released over a network. Even if the data stream has been copyrighted, there is no means to protect or enforce copyright protection of streamed data. The entity owning the copyright and streaming such content realize that there is no control over what is done with such content after it is released. Therefore, there is a need in the art to provide a means for protecting copyrights in content once streamed over a network. The present invention was designed to address both needs.

Currently, no streaming media solution actually encrypts the data that is being sent from the server to the client. One solution can accomplish this with existing technology, such as by merging SSL secure HTTP sockets with a streaming software package, such as Quicktime. Unfortunately, Quicktime does not have a full screen view option. Therefore, there is a need in the art to develop a better method for streaming video data.

SUMMARY OF THE INVENTION

The present invention provides a process for encrypting a data stream to secure the data stream to enable only single viewing, comprising:

(a) providing a client selection for a streaming data transmission (b) opening a connection to a streaming server and sending URI, token and user information to the streaming server, wherein the streaming server comprises a client data connection module to send data packets to a client, an encryption module to use encryption keys negotiated with the client to encrypt the data stream and operably connected to the client data connection module, and a flow control module for controlling the rate of data stream flow to maintain a full client buffer;

(c) approving or disapproving a valid or invalid, respectively, URI and token combination on a transaction server, wherein the transaction server comprises a client interaction module for connecting a user to the transaction server component, a user verification module having a user database wherein the user verification module is operably linked to the client interaction module and checking for a valid user, and a URI and token creation module operably linked to the user verification module for creating new URIs and tokens in response to user requests; and (d) providing a continuously encrypted data stream to the client if a valid URI and token combination was found.

The streaming server component may further comprise a read buffer module operable connected with the flow control module for reading in data from a source footage on storage medium. However, the data is not limited to this arrangement, and may include data from a variety of other sources, including an e-commerce transaction, an interactive television source, including a multicast service, a unicast service, and the like. The streaming server component may further comprise a user interface module operably connected to the file system module or flow control module for setting server options. The streaming server can further comprise client server component comprising a data stream control protocol module to create an initial connection to the streaming server component, a decryption module to decrypt the incoming data stream, an input buffer module to buffer incoming data streams, and a display control module to control the display of streaming data. The client server component may further comprise a display module to display audio and video data.

The providing the continuously encrypted data stream step (d) further may comprise a user interface module in the streaming server to allow for pausing, stopping, playing, restarting the data stream, or otherwise interacting with the data stream, and/or data stream source. In one embodiment, the transaction server is implemented with ASP scripts for encryption.

The present invention further comprises a streaming server for encrypting a data stream to secure the data stream to enable only single viewing, comprising:

(a) a streaming server component, wherein the streaming server component comprises a client data connection module to send data packets to a client; and encryption module to use encryption keys negotiated with the client to encrypt the data stream and operably connected to the client data connection module, and a flow control module for controlling the rate of data stream flow to maintain a substantially full client buffer; and (b) a transaction server component, wherein the transaction server component comprises a client interaction module for connecting a user to the transaction server component, a user verification module having a user database wherein the user verification module is operably linked to the client interaction module and checking for a valid user, and a URI and token creation module operably linked to the user verification module for creating new URIs and tokens in response to user requests.

The streaming server component may further comprise a read buffer module operable connected with the flow control module for reading in data from a source footage on storage medium. However, the data may also include data from an interactive source, source as interactive television services, and the like. The streaming server component may further comprise a user interface module operably connected to the file system module or flow control module for setting server options. The streaming server may further comprise a client server component comprising a data stream control protocol module to create an initial connection to the streaming server component, a decryption module to decrypt the incoming data stream, an input buffer module to buffer incoming data streams, and a, display control module to control the display of streaming data. The client server component may further comprise a display module to display audio and video data.

DETAILED DESCRIPTION OF THE PREFERRED EMBODIMENT

The present invention provides a process to encrypt a data stream, such as multimedia entertainment and communications, via a network, such as the Internet, and the like. The encrypted data stream will allow for copyrighted materials and multimedia communications (e.g., analyst meetings, interactive television, movies) on a secure, pay-per-view basis, and the like. The data stream cannot be stored on a client machine for future play-back, or retransmitted. A client, however, can view a data stream as many times as desired within a specified time frame.

An encryption protocol provides, for example, an encryption algorithm of a 192-bit key (e.g., Triple DES), a UDP packet protocol, a RTSP (rfc 2326) packet transmission protocol, an RTP (rfc 1889) packet transmission control protocol, and MPEGI video storage compression. However, the foregoing example of a preferred encryption protocol will change as such techniques improve with time. For example, one embodiment may employ the Advanced Encryption Standard (AES), or similar encryption algorithm.

One advantage of the inventive process, using the inventive streaming server and transaction server, is that the client does not really need to possess fully optimized equipment. One client typically runs on any one machine at any one time. The client may be configured to playback, for example, 30 fps 320×240 video and audio back with no jitter. This enables a data stream of about 250-300 kpa, a large data buffer (of at least several megabytes), and a 350 MHz Pentium II processor or greater running Windows 98 or Windows NT. However, the client system is not so constrained, and virtually any client system configuration may be employed. For example, the client system may include a set top box, an interactive television capability, and the like.

The server, for example, can be a fully optimized, multi-threaded (thread pool) Windows NT service. Unlike an HTTP server, this allows sessions with clients to be cached and the server will need to maintain state in respects to all clients.

Definitions

The following terms are used with the meanings defined herein. Client or client system includes the computer that the data stream is being sent to. User includes the person executing instructions on the client.

Module includes a collection of compiled code designed to perform a specific function, or set of functions.

URI (universal resource identifier) represents an identifier associated with a location on the server of the stream.

Token includes a binary piece of information that includes the permissions the user has for a specific data stream.

Authentication includes providing a level of confidence that a component, device, person, or other entity is who/what it claims to be. In some situations, authentication may sometimes be treated as synonymous with identity.

Authorization includes providing a level of access control, and is directed towards answering the question of what actions an entity may be entitled to perform. For example, authorization may address the question of whether the entity has permission to access selected data, when, and for how long.

CAS (Conditional Access System). CAS includes technologies directed towards controlling access to such as digital television services, and the like, by encrypting a transmitted programming. However, CAS is not directed solely to television. It may include digital radio broadcasts, digital data broadcasts, non-broadcast information, interactive services, and the like. Thus, CAS may include streaming data access, such as is described herein.

Rapid Renewal includes providing key generation, new keys, and new security mechanisms to a client device, system, and the like. In one embodiment, dynamic rapid renewal provides the renewed security mechanism on a random basis to create an unpredictable environment and target for others, such as hackers.

DRM (Digital Rights Management) includes a file based alternative mechanism to protection of media. DRM includes, for example, protection of content itself, such as streaming data. In one embodiment, a license file, or the like, may be issued to enable a user to play the content, either together with the content or when a user tries to play the content. The content, such as the streaming data, may be encrypted and the encryption properties may persist as the content travels between networks, servers, and a client.

DRM as described herein may employ a virtual smart card to enable management and protection of the content.

ECM (Entitlement Control Messages) includes encrypted data associated with entitlements, such as tokens, access constraints, content/encryption keys, and so forth.

EMM (Entitlement Management Messages) includes encrypted data such as entitlements, such as tokens, content/encryption keys, and so forth.

Intrusion Detection includes those mechanisms for detecting situations, which may violate a security policy and other protections.

Non-Repudiation includes mechanisms directed towards ensuring that a user, consumer, client, and the like, are unable to deny a validity of their digital signature. One embodiment employs two distinct keys. One key may be escrowed, and may be used for non-signing actions. The second key, may be without a recovery mechanism, and may be utilized for signing. In this embodiment, where the user may be in sole control of the signing key, non-repudiation may be achieved by use of a solely owned, yet verifiable secret. Where signing validity may be critical, a separate key may be used, and that key may be the solely owned yet verifiable secret of the key holder. In another embodiment, the key holder may refuse the validity of the signature based on the ability of a sufficiently privileged entity to replicate the secret key.

In a one embodiment of the inventive process and streaming server, the video may be stored unencrypted on the server machines; the files will only be retrievable through the server software. The inventive server will be responsible for (1) negotiating a set of encryption keys; and (2) encrypting the data stream "on the fly" thereby making the data packets that are actually going over the network useless to any computer other than the intended machine. One encryption standard is TRIPLE-DES with a 168-bit key. The server will use UDP for transmission of the data. This protocol uses considerably less network resources than other TCP protocols (http for example).

Client software will be responsible for decrypting the data stream and playback. The encryption keys used may be different every time the data stream is accessed. Every time the client is executed, a different encryption key is created so the client cannot play back earlier data streams if they were somehow saved to disk.

Illustrative Environment

Figure 1:
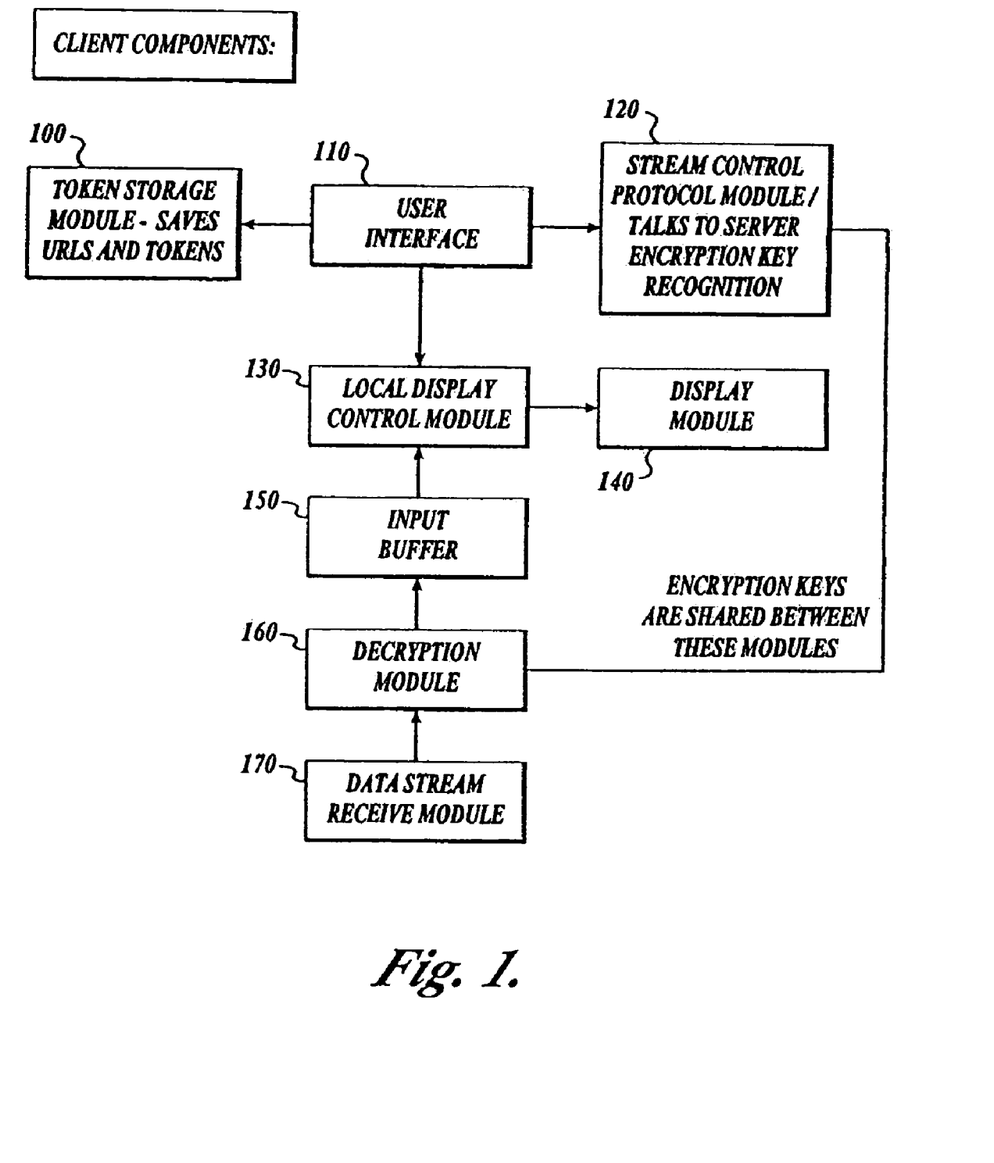
FIG. 1 shows a schematic of the client component enabled to receive and view an encrypted data stream. The client component includes a token storage module 100, a stream control protocol module 120, and a decryption module 160.

With regard to FIG. 1, this shows a schematic of one embodiment of the client component of the inventive process and streaming server enabled to receive and view and/or otherwise access an encrypted data stream. The client keeps a list of all current data streams and the corresponding tokens. This information is stored on the token storage module 100. This list will include the following three items: (1) the URI, (2) the token for that URI, and (3) the expiration date given by the server. In one embodiment, it may not be desirable for the client to have any way of determining if the token is valid or not. Because of this, and the need to remove out of date tokens, the server returns the expiration date. This information is used by the client to display information. The expiration date itself might never be sent back to the server, and the server verifies that the token passed is valid. Examples of module devices that can be used as token storage modules include, for example, Random Access Memory, secondary storage (hard disk), and embedded with software providing for token storage inventory and tracking of expiration dates.

The client communicates with a user interface 110. The client may have a standard user interface that will give the appropriate user experience. The interface will have the ability to look through current valid streams or to connect to the server to search for other streams that could be viewed. The client user interface 110 communicates with a local display control module 130 and a stream control protocol module 120. The client has to be able to setup a communications session with the server as well as control the flow of data from the server once the stream is being viewed. The stream control protocol module 120 creates the initial connection by connecting to the server, passing the requested URI, Token, and user information. The stream control protocol module 120 then negotiates a set of encryption keys and controls the flow of data from the server. Examples of stream control protocol module devices 120 within a client component that can be used to negotiate a set of encryption keys and control the flow of data from a server include, for example, Random Access Memory and the network interface card or modem. The software may monitor the rate of the data being received by sending network statistics, information associated with the buffer, including percent full, percent remaining, and the like, as well as other client characteristics to the streaming server. The display control module 130 controls the display of the data, and has the ability to pause, stop, or re-start the data stream. Examples of display control modules suitable for use within the client component include, Random Access Memory and the video card. The software running in this module will convert the data being sent form the server into a format that can be displayed to the user.

The display module 140 displays video and audio data. The input buffer module 150 is a module that includes the stream buffer. The stream buffer may include a circular buffer of decrypted data that the display control module reads from and the decryption module writes to. Examples of stream buffer module devices that can be used to include a circular buffer of decrypted data include, for example, Random Access Memory. As packets are being received from the server, before the data is put into the input buffer, the data within the transport packet is decrypted by a decryption module 160 using the keys negotiated by the stream control protocol module 120.

Decryption module 160 may be implemented using virtually any decryption mechanisms, including those that may be commercially. For example, SSL, DES, and RSA modules may be available and suitable for use as a decryption module. Lastly on the client component sides is a data stream receive module 170. This module handles the reception of the data packets sent by the server.

Appropriate module devices that can be used as a data stream receive module within the client component includes, for example, Random Access Memory. The software included in this module may save the data being received by the client in a format that can be used by subsequent modules.

Figure 2:
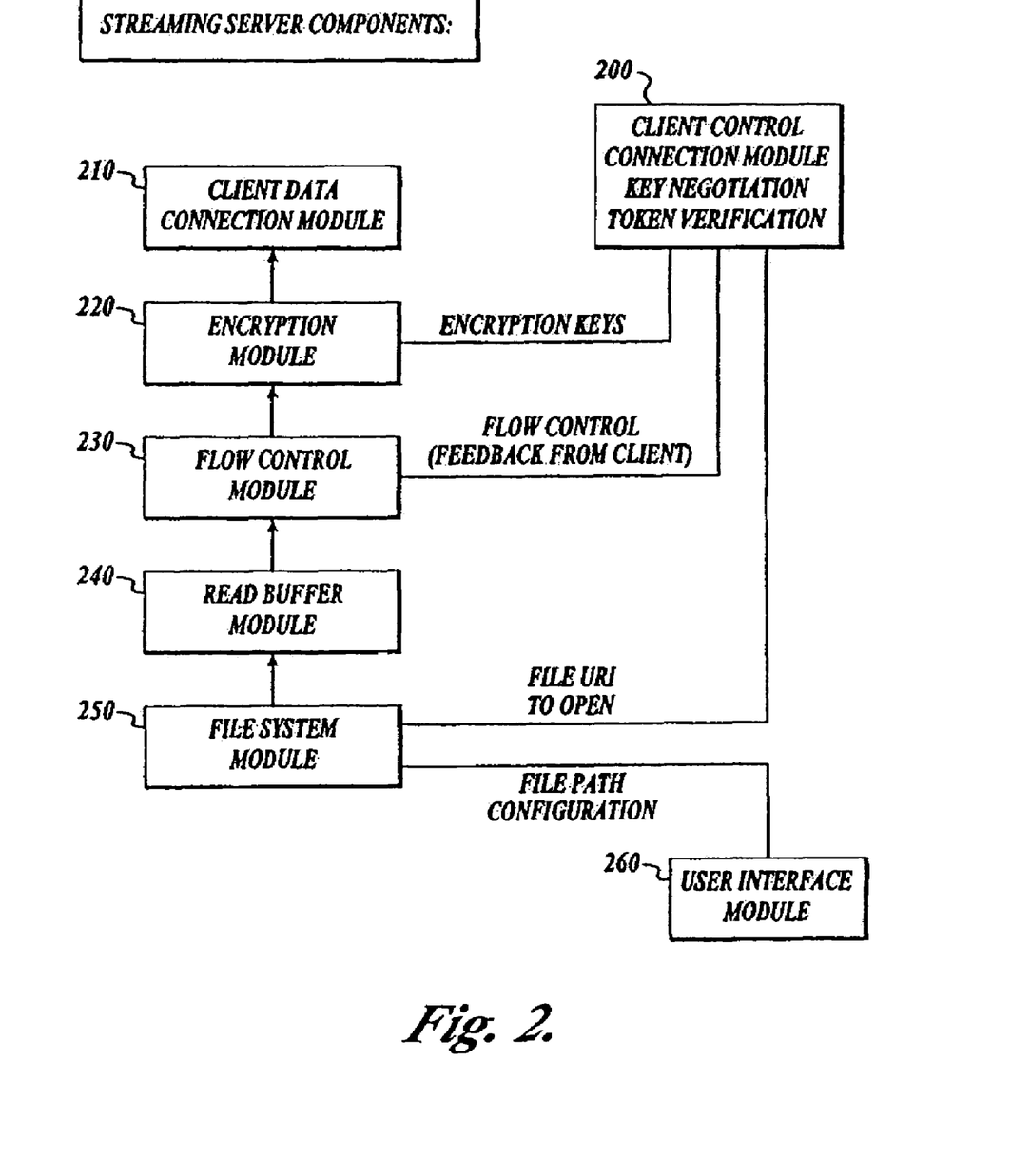
FIG. 2 shows a schematic of the streaming server component having at least an encryption module 220 and a client control connection module for key negotiation and token verification 200.

With regard to FIG. 2, the client control connection module 200 will handle control communications between the client and the server. The client and server will negotiate a set of encryption keys. The client will send user information, the URI, and the token to the streaming server via the client control connection module 200. From this module 200, the data that is streamed to the client can be controlled (that is, paused, stopped, or restarted). Hardware devices suitable for use as a client control connection module within the streaming server include Random Access Memory. Such hardware components allow for the execution of hardware non-specific operations. Such software is either embedded in the client control connection module or uploaded therein. The software functions to create a process wherein the client and server communicate current network conditions and modify the data stream accordingly.

The client data connection module 210 functions to send data packets to the client using a connectionless protocol to reduce server overhead. Hardware devices suitable for use as a client data connection module within the streaming server include Random Access Memory and Network Interface Cards. Such software is either embedded in the client data connection module or uploaded therein. The software functions to create a process wherein the encrypted data is sent via network packets to the client machine.

The encryption module 220 uses the keys negotiated by the client/server to encrypt the data stream as it is being sent to the client. This allows for "on the fly" encryption and the encryption keys will be unique for all client/server connections. This allows the source footage to be stored unencrypted on the server, where appropriate. Hardware devices suitable for use as an encryption module within the streaming server include Random Access Memory and proprietary hardware encryption devices. Such hardware components include software that functions to do the actual encryption of the data. Such software may either be embedded in the encryption module or uploaded therein. The software functions to create a process wherein the data being sent to the device is encrypted with the keys originally negotiated with the client and the output data is of a format that can only be read after being decrypted by the client.

The flow control module 230 makes sure that the data stream is being sent by the server at the rate in which the client is using the data. The buffer at the client needs to be full at all times but streaming data must also not be overwritten. Thus, the flow control module communicates with both the encryption module 220 and uses feedback obtained from the client control connection module 200. Hardware devices suitable for use as a flow control module within the streaming server include Random Access Memory. Such software may be either embedded in the flow control module or uploaded therein. The software functions to create a process wherein the flow of data from the server to the client is regulated.

The file system read buffer 240 is for server performance. Small amounts of data read in from the file may be stored in memory instead of having a constant open file on the file system. The file system module 250 is responsible for reading in data from the source footage on the storage medium or elsewhere. The file system module communicates with the client control connection module 200 to open URIs and the user interface module 260 to file path configurations. Hardware devices suitable for use as a file system module within the streaming server include Random Access Memory. Such hardware components include software that functions to allow the access to data streams. Such software may be either embedded in the file system module or uploaded therein. The software functions to create a process wherein the data stored on the secondary storage device can be loaded into Random Access Memory to be delivered to the encryption module.

The streaming server further provides a simple user interface module 260 for setting server options such as which network port to bind to and the location of source footage. Hardware devices suitable for use as a file system module within the streaming server include Random Access Memory. Such software is either embedded in the file system module or uploaded therein. The software functions to create a process wherein the user of the server software can tell the file system module where to go to find the data streams.

Figure 3:
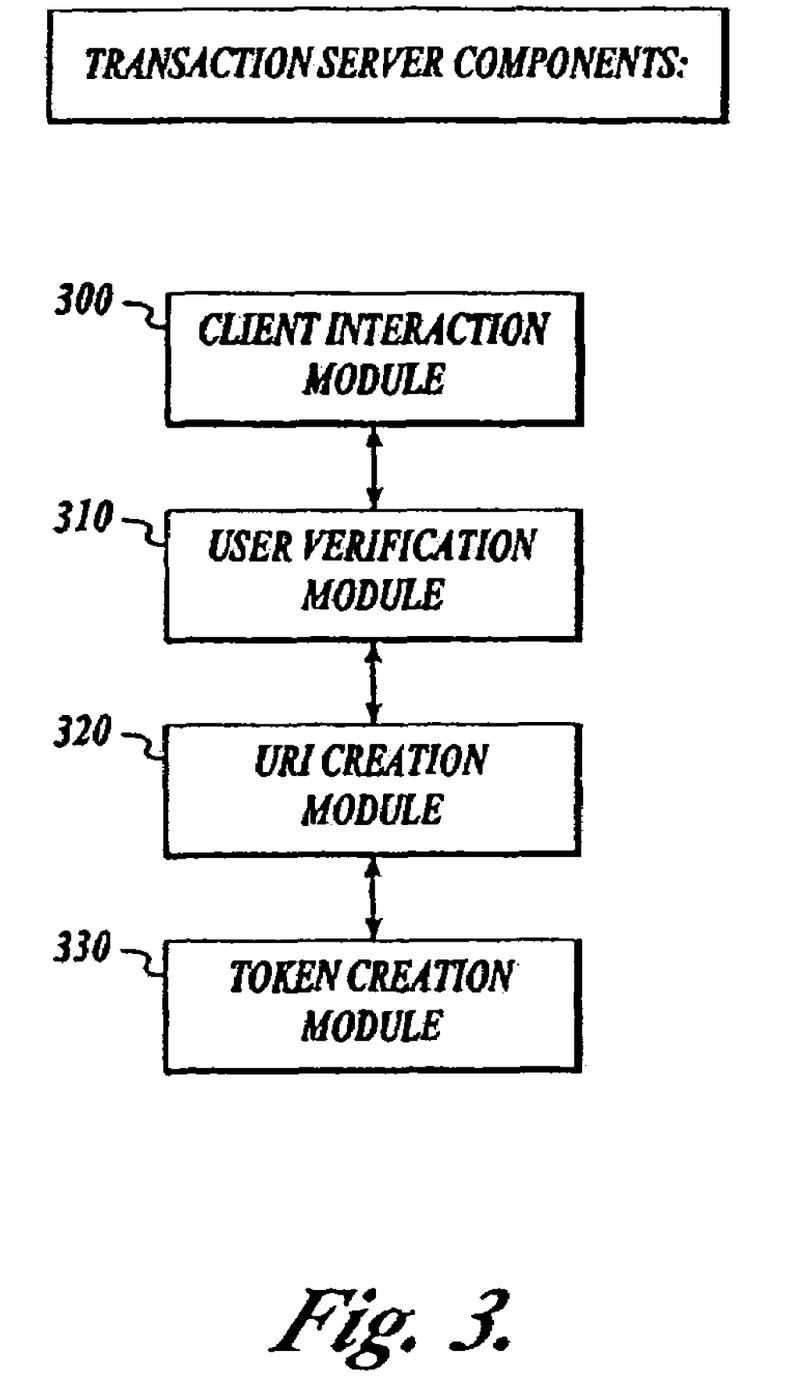
FIG. 3 shows a schematic of the transaction server components having a token creation module 330 and a user verification module 310.

With regard to FIG. 3, the transaction server comprises four module components. To access a video stream, the client must first obtain a transaction token. The transaction token may be based on a pay-per-view scheme in which the token will be valid for a certain time period. The time a token is valid for is dependent on what the user selects and what options are available for the selected stream. The user contacts the transaction server, via a client interaction module 300, with the user information and the URI. The transaction server will determine what time options are available for the token and present that to the user. After the user selects the required time limit, the request is passed off to the user verification module 310. Hardware devices suitable for use as a client interaction module within the transaction server include Random Access Memory. Such software may be either embedded in the client interaction module or uploaded therein. The software functions to create a process wherein the user information is verified against the database and a valid token is created based, in part, upon the options requested by the user.

The user verification module 310 checks for user information passed against a user database to see if the user is valid or not. The user database resides in memory of the user verification module. Hardware devices suitable for use as a user verification module within the transaction server include Random Access Memory. Such software is either embedded in the user verification module or uploaded therein. The software functions to create a process wherein the token passed is verified. The URI creation module 320 and the token creation module 330 are tied together and the token is based, in part, upon the requested URI. This means that the token is unique to the request URI and cannot be used for any other stream. This information is then passed back to the client via module 300. Hardware devices suitable for use as a URI creation module and token creation module, each located within the transaction server, include Random Access Memory. Such hardware components may include software that functions within the Random Access Memory. Such software may be either embedded in the URI creation module or token creation module or uploaded therein. The software functions to create a process wherein a valid URI to the media stream the user selected are created.

Illustrative Operations

Figure 4:
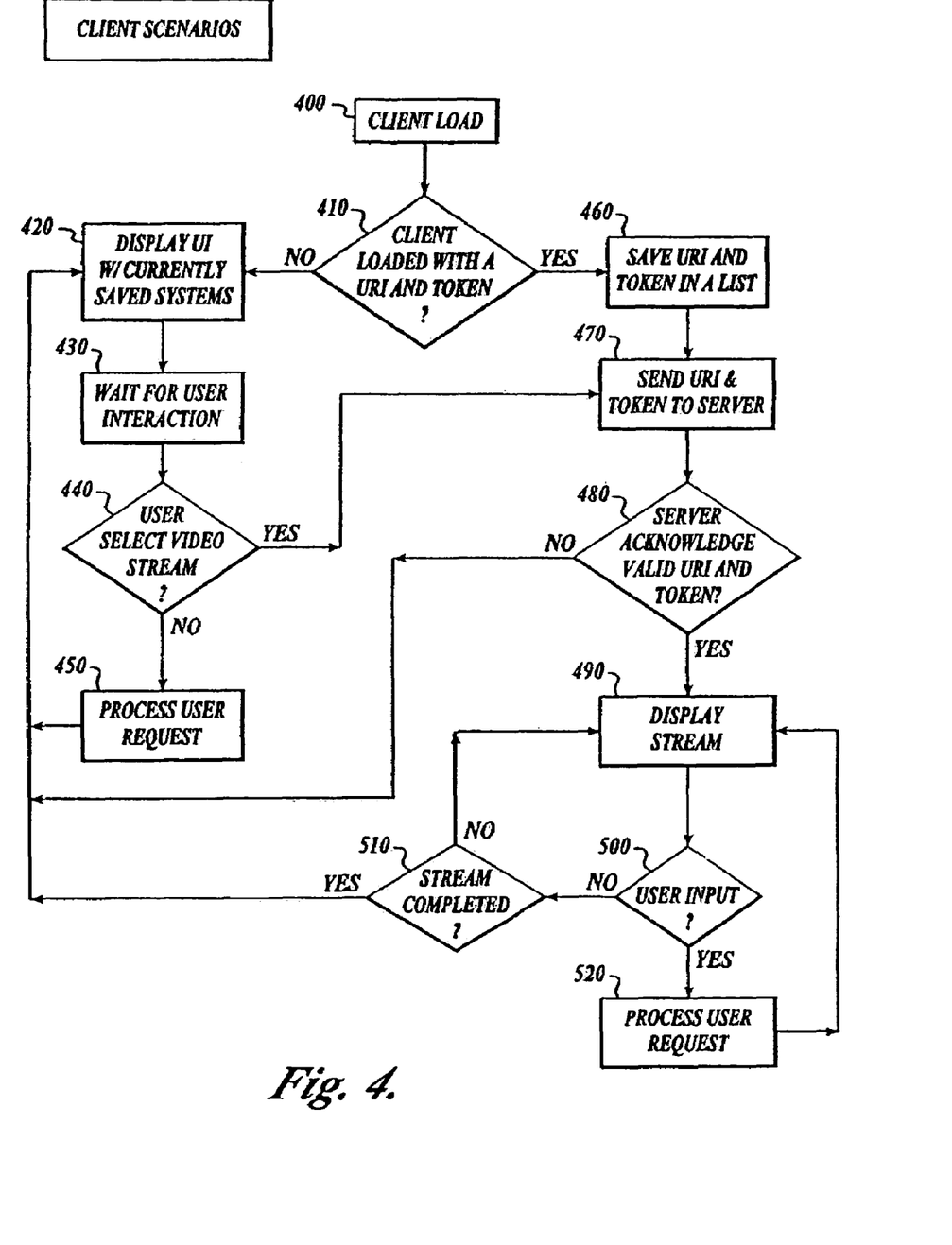
FIG. 4 shows a schematic of various client scenarios showing the need for a token in order to unlock (decrypt) a data stream for viewing.

With regard to FIG. 4, the client 400 executes and the client is loaded with a URI and a token 410. The client either double clicks on the client's icon (no) or it launched by a media server (yes). If the media server launched the client, there will be a requested URI and token in the command-line parameters of the client. A display a window (420) lists all the purchased (and current) data streams available to view, or otherwise interact with. The user will be able to select a data stream to access by double clicking on the title of the stream. The screen waits for input from the user (430) and the user selects a data stream or another housekeeping option (440). If a housekeeping option was selected, execute user request (450) and go back to displaying video streams with module 420.

If the user launches a data stream (selects yes from 410) a URI and token is saved in the purchased streams list so it can be viewed again at a later time 460. A connection to the streaming server is opened and the URI, token and user information is sent to the streaming server 470. The streaming server acknowledges a valid (or invalid) URI and token combination 480. If the token is invalid or has expired, the server will close the connection and the client will go back and display all the data streams that are available to view. If the server acknowledges a valid URI and token combination, the client will start to receive data from the streaming server and display it 490.

If the data stream finishes or the user selects any of the available stream options such as pause, stop, play, or restart 500, the stream will stop and await further user input. If the stream has finished playing 510, the process goes back to the list of available streams 420, or continues displaying the data stream 490 by processing a user request 520 and then going back to displaying the stream 490.

Figure 5:
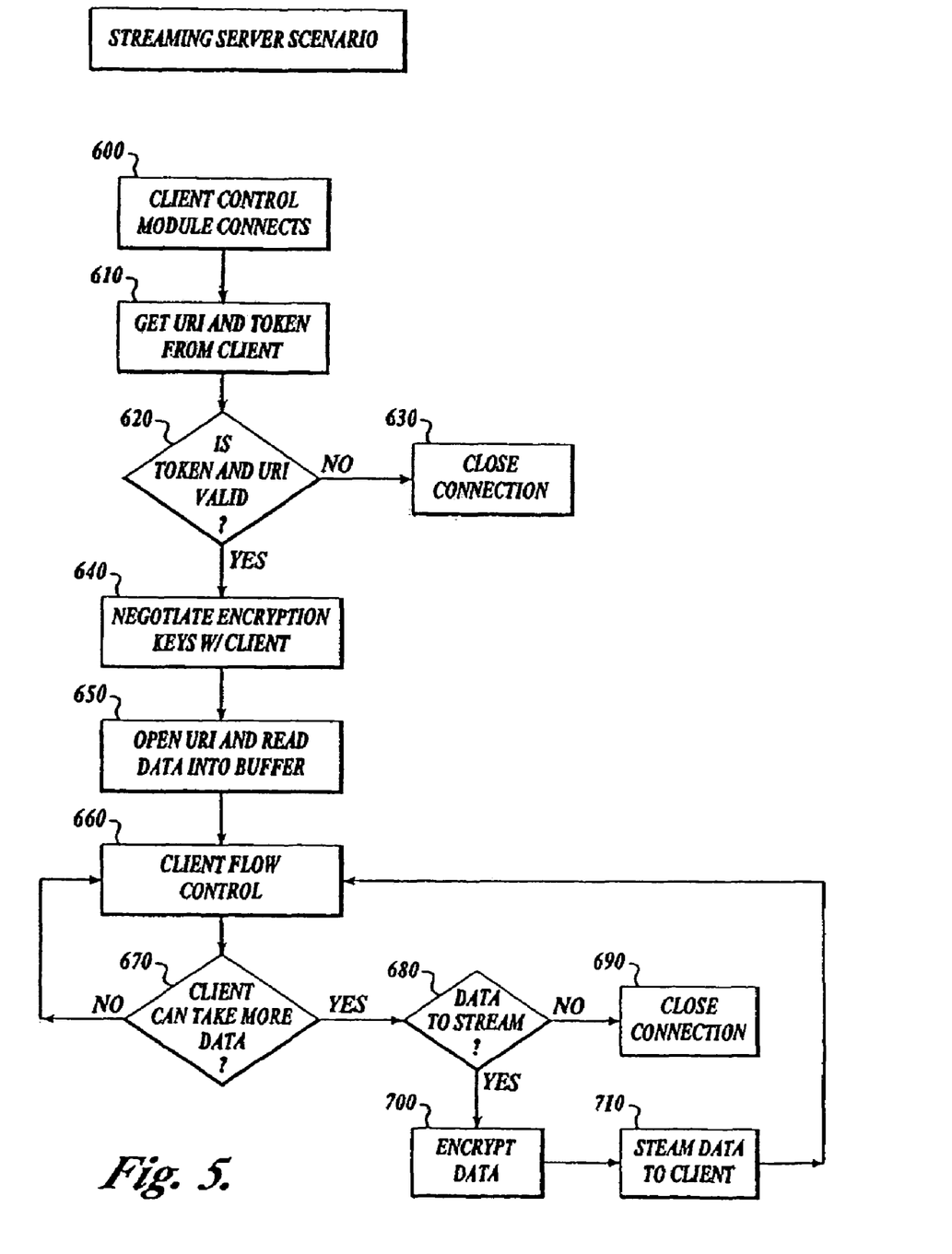
FIG. 5 shows a schematic of the process for the streaming server showing the receipt of a client token triggering a negotiation of encryption keys to allow viewing and receipt of a data stream.

With regard to FIG. 5 and the process run by the streaming server, there is first a connection with the client control module 200, 600 to allow the client to establish a connection with the streaming server. The client will provide the URI, token and user information 610 from user 470. The streaming server determines if the token and URI are valid 620. If the token is invalid or has expired, the connection to the client will be closed with an appropriate error message 630. If token is valid, a set of unique encryption keys will be negotiated with the client 640. A URI will be opened and the streaming data will be read into a buffer 650.

The client flow control module 230 provides for the client and streaming server to have a flow control connection established to make sure that the data stream is leaving the streaming server at substantially the same rate it is being used at the client end 660. This addresses bandwidth issues as well as making sure that the client play buffer is not overwritten. Therefore, the client flow control mechanism 660 uses the client flow control module 230 to obtain feedback from the data buffer in the client 710 and control the rate of the data stream to keep the client buffer as full as possible. If the client cannot accept any more data at this time, return to flow control module so indicates 670 to slow down or pause the streaming data. If the client can accept more data 680, the client flow control will first determine if there are more data to stream 680. If there are no more data to stream, the data stream could be completed, and the client connection will be closed 690. If there is more data to be sent, the data waiting in the send buffer will be encrypted 700 and the encrypted data will be sent to the client 710.

Figure 6:
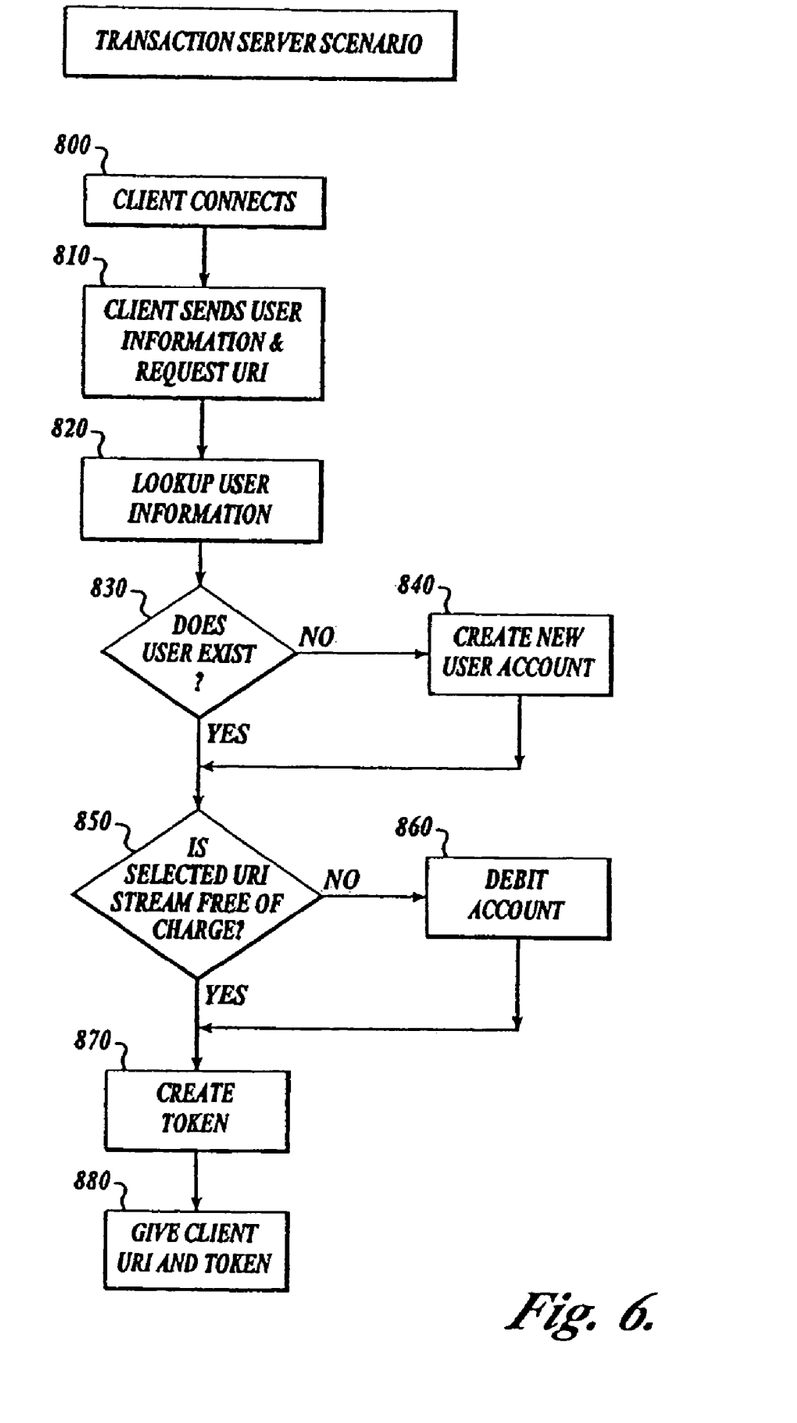
FIG. 6 shows a schematic of the transaction server process providing for setting up of client accounts and token creation.

With regard to FIG. 6 at the transaction server, the client first connects to the transaction server, for example through a web page 800. In one embodiment, the transaction server will be implemented with ASP scripts. However, the invention is not so limited, and virtually any mechanism may be employed, without departing from the scope or spirit of the invention. The client sends request URI and user information through ASP command-line arguments 810 and the transaction server user verification module 310 will determine the time limits of available tokens and display them to the user for selection. The transaction server will look up user information 820 in a database in the user verification module 310. Examples of looking up user information are whether or not a user has an account (e.g., an account exists according to the transaction server) 830. If the user does not have an account 840, a transaction will be opened up to create new account page and get information from the user 840. In addition, the transaction server user verification module 310 will determine if the URI that was requested is free of charge 850. If the URI costs money 860, the transaction server user verification module 310 will debit a credit card that is in the user database. This process will create a URI in the URI creation module 320 of the transaction server.

Once a URI is provided and either paid for or provided free, a token will be created 870 in the token creation module 330. The token now created will be linked with the URI and a time limit will be selected 880. Lastly, the viewer will be started on the client machine and sent back to the client along with the URI and the created token.

Client Components within an Illustrative Virtual Smart Card

The client components described above in conjunction with FIG. 1 may be employed in a variety of client systems. Such client systems may include devices that typically connect using a wired communications medium such as personal computers, multiprocessor systems, microprocessor-based or programmable consumer electronics, set top boxes, interactive television devices, point of deployment interfaces and modules, network PCs, and the like. Such devices may also include devices that typically connect using a wireless communications medium such as cell phones, smart phones, pagers, walkie talkies, radio frequency (RF) devices, infrared (IR) devices, CBs, integrated devices combining one or more of the preceding devices, or virtually any mobile device, and the like. Similarly, client systems that may employ the client components of FIG. 1 may be any device that is capable of connecting using a wired or wireless communication medium such as a PDA, POCKET PC, wearable computer, and any other device that is equipped to communicate over a wired and/or wireless communication medium.

Such client systems may also be configured to employ the streamed data for a variety of reasons, including, enjoying movies, audio clips, and the like. In one embodiment, the streamed data may include at least a portion of data associated with an interactive television service. The streamed data may even be associated with banking activities, e-commerce activities, and the like.

Moreover, the client components of FIG. 1 may be arranged in a variety of configurations, and be associated with a variety of architectures. For example, in one embodiment, the client components of FIG. 1 may be arranged within a client system having a virtual smart card (VSC). Additionally, the client components may be employed in conjunction with an interactive television environment using the VSC.

Figure 7:
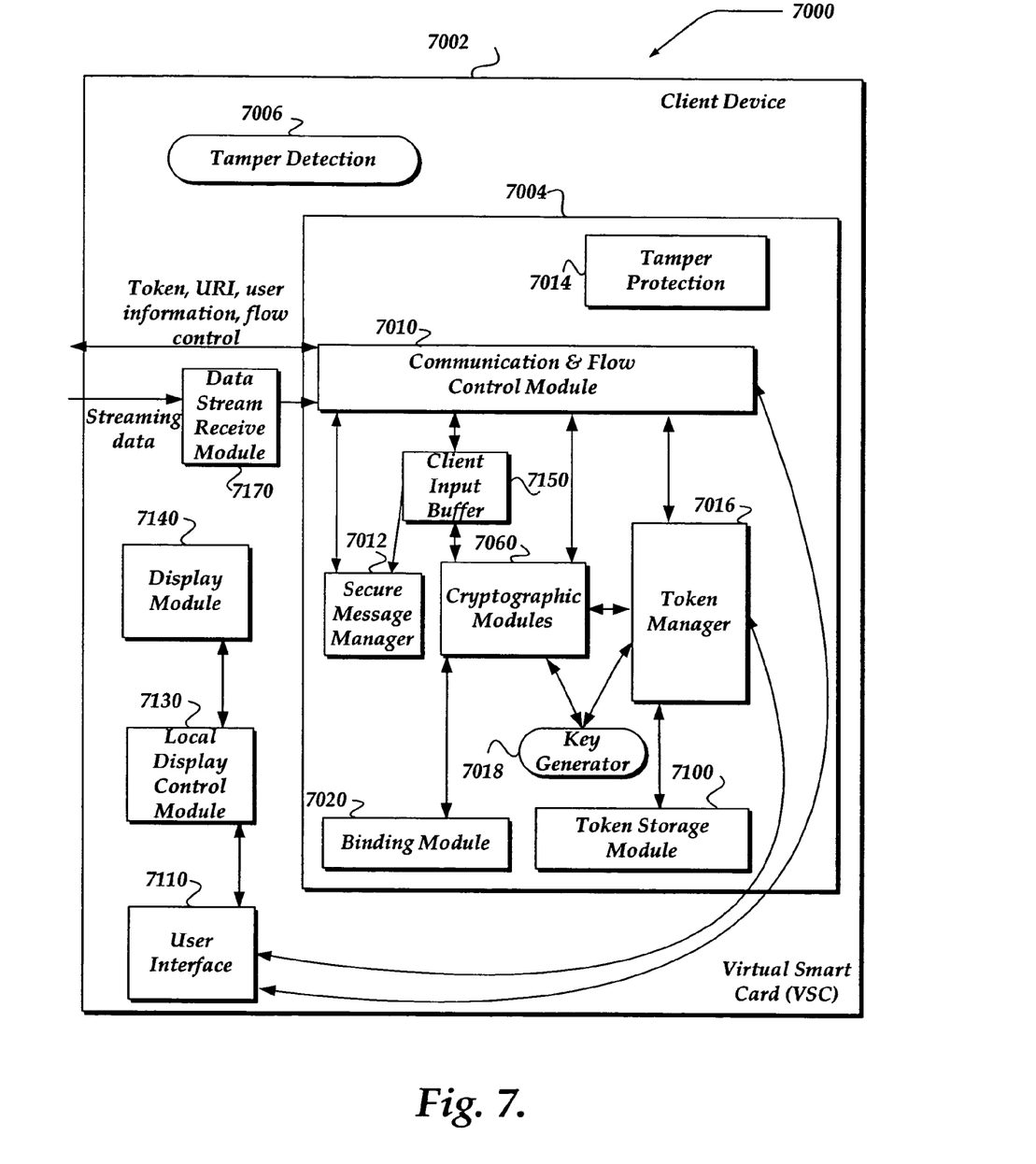
FIG. 7 shows an embodiment of a virtual smart card (VSC) within a client device that is configured to operably interact with a transaction server to manage a data stream, in accordance with the present invention.

FIG. 7 shows one embodiment of such an arrangement for the VSC within a client device that is configured to operably interact with a transaction server in a manner substantially similar to that described above in conjunction with FIGS. 2-6. Client system 7000 of FIG. 7 may include many more components than those shown. The components shown, however, are sufficient to disclose an illustrative embodiment for practicing the invention, and variations in the arrangement and type of the components may be made without departing from the spirit or scope of the invention.

Use of the described VSC enables privacy (confidentiality), integrity, timeliness, access control (authorization), and authentication (identity), as well as rapid renewal, cross link copy protection or digital rights management, and greater capacity, flexibility, and an ability to bind to a device to provide increased security.

As shown in the figure, client system 7000 includes client device 7002. Client device 7002 includes VSC 7004, tamper detection 7006, data stream receive module 7170, display module 7140, local display control module 7130, and user interface 7110. VSC 7004 includes communications & flow control modules 7010, secure message manager 7012, tamper protection 7014, client input buffer 7150, token manager 7016, cryptographic modules 7060, token storage module 7100, key generator 7018, and binding module 7020.

User interface 7110 operates substantially similar to user interface 110 of FIG. 1. User interface 7110 may include a variety of client input devices including a mouse, keyboard, microphone, touch-screen, remote control device, and the like, that is configured to provide an ability to select a data stream, as well as provide information.

Local display control module 7130 operates substantially similar to local display control module 130 of FIG. 1. That is, local display control module 7130 may be virtually any device, software, combination of software and hardware, and the like, that enables the control of a display of data, and an ability to pause, stop, start, and re-start a data stream.

Display module 7140 operates substantially similar to display module 140 of FIG. 1. That is, display module 7140 enables a presentation of the data stream, including video data, audio data, and the like, to a user. Display module 7140, for example, may enable the presentation of an interactive television data stream.

Data stream receive module 7170 operates substantially similar to data stream receive module 170 of FIG. 1. That is, data stream receive module 7170 is configured to mange a reception of data packets associated with the data stream sent by the server. Data stream receive module 7170 may be further configured to provide the received data packets to communication & flow control module 7010.

Token storage module 7100 is configured to operate substantially similar to token store module 100 of FIG. 100. That is, token storage module 7100 is configured to provide secure storage for URIs, tokens associated with a stored URI, an expiration data associated with the token, and the like. Moreover, token storage module 7100 is further configured to provide a secure local store that is tightly bound to client device 7002. Token storage module 7100 may be implemented as a file, folder, database, or the like. Binding to the client system is performed employing binding module 7020. Local security may be provided using any of a variety of encryption, obfuscation, and through use of various network resources.

Binding module 7020 is configured to uniquely identify client device 7002, the server system, or the like. In one embodiment this is achieved by employing a fingerprint. A fingerprint may be made up of a number of elements specific to each fingerprint. Such elements are termed herein as ridges. Each ridge includes an element of a fingerprint that provides information to the fingerprint making it unique from other fingerprints. Some examples of ridges include a hardware serial number, operating system version number, Internet Protocol address, physical memory size, and the like. Each ridge included within the fingerprint refines the identity of the system so that it may be uniquely identified within a system. The combinations of all fingerprints may create a handprint or system fingerprint that uniquely identifies a personal computer, server, client device, set top box, or similar device within the system. An order of each of the fingerprint groups and individual ridges may affect the resulting system fingerprint or handprint. That is, each user of binding module 7020 may generate a unique fingerprint and subsequent handprint even though the core ridge information being utilized is the same.

Use of the generated fingerprint binds VSC 7004 to a specific device, such as client device 7002, such that it will not properly function if cloned and attempted to be run on another device. This approach virtually eliminates the common hacker approach of physical smart card piracy.

In one embodiment, VSC 7004 may be combined with another device, such as a physical smart card, to further increase the secure identity characteristics of the physical card to the device fingerprint while maintaining flexibility and power of VSC 7004. This may be done, for example, in a system where device identity is inherently weak, where cost and/or convenience of the physical card, or other device, may not be a concern.

Communication & flow control module 7010 is configured to enable communications and flow control of data between VSC 7004 and the transaction and streaming servers. As such, communication & flow control module 7010 may perform actions substantially similar to some actions performed by stream control protocol module 120 of FIG. 1. That is, communication & flow control module 7010 may enable an initial connection to a server, and enabling a passing of a requested URI, token, and user information.

Communication & flow control module 7010 may also enable flow control of the data from the server to ensure that a rate of flow maintains a substantially full client buffer (e.g., client input buffer 7150), substantially similar to stream control protocol module 120 of FIG. 1. Communication & flow control module 7010 may do so, for example, by monitoring various characteristics, such as a rate that data is being received, network statistics, input buffer statistics, and so forth. As such, communication & flow control module 7010 may enable a query of input buffer 7150 to determine a percentage full, a rate of being filled, a percentage of buffer space remaining, and the like. Communication & flow control module 7010 may then provide a flow control metric based on the monitored characteristics to the server, either encrypted or unencrypted. If the information is provided in an encrypted manner, communication & flow control module 7010 may employ secure message manager 7012 to ensure that the information is secure.

Secure message manager 7012 is configured to provide a secure medium for message exchange. Although not illustrated, secure message manager 7012 interacts with a variety of other components of VSC 7004 as required to ensure that mutual authentication of end parties is accomplished and privacy of messages is maintained.

Token Manager 7016 is configured to manage the receipt, storage, sending, and interpretation of tokens, and similar entitlements. As such, token manager 7016 may perform various actions associated with stream control protocol module 120 of FIG. 1. For example, token manager 7016 may pass the requested URI, token, and user information to a server. Token manager 7016, may also negotiate a set of encryption keys with the server, by employing cryptographic modules 7060 and/or key generator 7018. Moreover, token manager 7016 may employ secure message manager 7012 to enable secure communications between a server and client device 7002.

Tokens have been briefly described above. In one embodiment, the token, however, may also include a digital certificate that may include identification information, encryption keys, and the like, associated with such as a Certification Authority. Such token structure as employed by VSC 7004 provides a unique concept of entitlement chains, which may expand a business model beyond that which is typically supported by a traditional Certification Authority model. However, the invention is not so constrained, and the token structure may employ virtually any structure that is configured to associate user permissions to a specific data stream.

Cryptographic module 7060 is directed towards providing cryptographic mechanisms for performing such as encryption, decryption, digital signatures, key generation, and so forth. For example, cryptographic module 7060 may include asymmetric cryptographic mechanisms that are configured to provide public/private key based cryptographic actions. Public/private cryptographic actions include key generation, digital signatures, encryption, decryption, and integrity checking. Cryptographic module 7060 also enables a secure exchange of encryption keys, through token manager 7016 and secure message manager 7012.

Cryptographic module 7060 is further enabled to receive secure content from communications and flow control module 7010, decrypt the secure content, and to send the decrypted content to client input buffer 7150.

Client input buffer 7150 operates substantially similar to client input buffer 150 of FIG. 1. That is, client input buffer 7150 is configured to include the stream buffer. It is important to note that, although client input buffer 7150 is illustrated within VSC 7004, the invention is not so limited. For example, client input buffer 7150 may reside within client device 7002 and outside of VSC 7004.

Cryptographic module 7060 is configured to provide a variety of cryptographic keys, including symmetric or private keys, asymmetric or public keys, and the like. Although cryptographic module 7060 may employ virtually any cryptographic mechanisms, in one embodiment, cryptographic module 7060 employs AES for symmetric cryptography. In another embodiment, cryptographic module 7060 employs RSA for asymmetric cryptographic actions.

Key generator 7018 is configured to employ cryptographic module 7060 to enable generation of cryptographic keys. Such generation may employ for example, a rapid renewal mechanism whereby the new generation of keys may be performed within a short period of time, compared to traditional physical smart card key replacement mechanisms. In one embodiment key generator 7018 may enable generation of new keys within hours rather than days, weeks, or even months. In one embodiment, to further obfuscate a potential point of attack dynamic rapid renewal is employed, wherein regeneration of keys, and the like, is performed on a random basis to create an unpredictable environment. In another embodiment, such dynamic rapid renewal may also be employed to replace various software components that may further minimize an attack. Employing such rapid renewal of enables use of VSC 7004 in a variety of other situations, including banking, enterprise security, e-commerce, and by studios for content distribution.

Tamper detection 7006 and tamper protection 7014 may be applied at a variety of points within client system 7000 to ensure a highly secure infrastructure. Typically, some level of tamper protection or resistance may be provided as part of the software and/or hardware of VSC 7004. As shown, VSC 7004 includes tamper protection 7014 to provide protection or resistance from tampering, and similar hacking approaches. This protection may further include agents that are configured to perform various actions, including in-circuit emulator detection, debugger detection, debugger resistance, memory space violation detection and protection, as well as similar application level piracy behavior detection and protection.

Tamper detection 7006 is configured to identify tampering from other systems, such as those on client device 7002, and the like. For example, in an interactive television environment it may be possible to deploy tamper detection within a network to monitor for cloning attempts of virtual smart cards and/or its various components. Tamper detection 7006 may further provide a trusted time source, thereby preventing replay attacks.

Operationally, VSC 7004 may perform substantially similar to that described in FIG. 4. For example, as described in FIG. 4, the client is loaded with a URI and a token (see block 400 of FIG. 4). This action may arise in FIG. 7 through an interaction with communication & flow control module 7010, as well as a user interface 7110, display module 7140, and the like.

If the user launches a data stream at decision block 410 of FIG. 4, the process moves to block 460, where a URI and token is saved employing token manager 7016 and token storage module 7100. Moving next to block 470, communication & flow control module 7010, in conjunction with token manager 7016, sends the URI, token, and user information to the streaming server.

If, at decision block 480, the server acknowledges a valid URI and token combination, processing proceeds to block 490 of FIG. 4, where data is streamed from the streaming server. Such streaming of data may be received by data stream receive module 7170 and sent to communication & flow control module 7010, where decryption of the received stream may occur through the use of cryptographic modules 7060. The decrypted data stream may then be placed into client input buffer 7150, at a rate that is directed at maintaining a substantially full client buffer. Communication & flow control module 7010 provides flow control information during the streaming of the data to ensure the client buffer is substantially full.

The above specification, examples, and data provide a complete description of the manufacture and use of the composition of the invention. Since many embodiments of the invention can be made without departing from the spirit and scope of the invention, the invention resides in the claims hereinafter appended.

What is claimed as new and desired to be protected by Letters Patent of the United States is:

1. A system for communicating a data stream over a network, comprising:
   a client device that is configured to perform actions, including:
      enabling a request for the data stream;
   a virtual smart card coupled to the client device, the virtual smart card being configured to perform actions, including:
      sending a token associated with the requested data stream;
      receiving the requested data stream, wherein the requested stream is encrypted; and
      providing a flow control metric associated with the data stream; and
   a streaming server that is configured to perform actions, including:
      validating the token for the requested data stream, and if the token is valid for the requested data stream, flowing the encrypted data stream to the virtual smart card, and
      employing the flow control metric from the virtual smart card, in part, to control the flow of the encrypted data stream over the network to maintain a substantially full buffer associated with the virtual smart card.

2. The system of claim 1, wherein the virtual smart card further comprises a token manager that is configured to negotiate with the streaming server for the token.

3. The system of claim 1, wherein validating the token for the requested data stream further comprises validating an identifier associated with a location of the data stream with the provided token.

4. The system of claim 1, wherein the virtual smart card further comprises a flow control module that is configured to monitor at least one of a network statistic, and a buffer characteristic to determine the flow control metric.

5. The system of claim 1, wherein the virtual smart card further comprises a binding module that is configured to uniquely associate the virtual smart card to the client device.

6. The system of claim 1, wherein the streaming server is configured to perform further actions, including negotiating encryption keys with the virtual smart card for use in encrypting the requested data stream.

7. The system of claim 6, wherein the virtual smart card further comprises a token manager that is configured to interact with the streaming server to negotiate the encryption keys.

8. The system of claim 7, wherein the virtual smart card further comprises a token storage module that is configured to store at least one of the user information, the token, a URI, and the encryption keys.

9. The system of claim 1, wherein the token further comprises a digital certificate.

10. The system of claim 1, wherein the data stream is provided to the client device such that is viewable for a predetermined number of viewings.

11. A computer readable storage medium for managing a data stream over a network, the computer readable storage medium having computer executable instructions stored thereon that when installed into a server enables the server to perform action, comprising:
receiving a request for the data stream from a client having a virtual smart card;
receiving, from the virtual smart card, a token that is associated with the requested data stream;
enabling a determination of validity of the token for the requested data stream;
if the token is valid for the requested data stream,
enabling a negotiation for an encryption key with the virtual smart card;
enabling an encryption of the data stream as the data stream is streamed to the client, wherein the data stream is encrypted using the negotiated encryption key;
providing, by the virtual smart card, a flow control metric associated with the encrypted data stream; and
controlling, by the server, over the network a rate of flow of the encrypted data stream to the client, wherein the server employs the flow control metric, in part, to control the rate of flow of the encrypted data stream to maintain a substantially full client buffer.

12. The computer readable storage medium of claim 11, wherein the data stream is configured for a single viewing.

13. The computer readable storage medium of claim 11, wherein controlling the rate of flow further comprises transmitting the encrypted data stream to the client at substantially the same rate as the encrypted data stream is received by the client.

14. The computer readable storage medium of claim 11, wherein providing the flow control metric further comprises monitoring at least one of a network statistic, and a client buffer characteristic.

15. A client device for use in receiving a data stream over a network, comprising:
a user interface that is configured to perform actions, including:
enabling a request for the data stream; and
a virtual smart card, coupled to the user interface, configured to perform actions, including:
negotiating a token associated with the requested data stream;
employing the token to enable a validation of the request for the data stream;
if the request is valid, receiving the data stream from a server that is configured to deliver the data stream at a rate of flow that maintains a substantially full client buffer in the client device; and
providing a metric to the server to be employable by the server to control the rate of flow of the data stream so as to maintain the substantially full client buffer.

16. The client device of claim 15, wherein the user interface is configured to perform further actions, comprising:
enabling a user selected time limit for accessing the data stream to be provided to the server, wherein the user selected time limit is associated with the negotiated token such that the access to the data stream is denied upon expiration of the time limit.

17. The client device of claim 15, wherein the token includes user permissions for the requested data stream.

18. The client device of claim 17, wherein the user information includes user account information.

19. The client device of claim 15, wherein the token includes a user selected time limit for accessing the data stream, wherein access to the data stream is denied upon expiration of the user selected time limit.

20. The client device of claim 15, wherein the received data stream is encrypted using at least one of DES, Triple-DES, and AES encryption.

21. The client device of claim 15, wherein the virtual smart card is uniquely bound to the client device.

22. The client device of claim 15, wherein the virtual smart card further comprises a tamper protection module that is configured to detect and to protect from tampering of the virtual smart card.

23. The client device of claim 15, wherein the virtual smart card includes the client buffer.

24. A method for communicating a data stream over a network, comprising:
requesting the data stream;
employing a virtual smart card that is bound to a client device to negotiate a token associated with the requested data stream;
employing the negotiated token to enable a validation of the request for the data stream;
if the request is valid, receiving the data stream from a server that is configured to deliver the data stream at a rate of flow that maintains a client buffer substantially full; and
providing, by the virtual smart card, a metric to the server to be employable by the server, in part, to control the rate of flow of the data stream so as to maintain the substantially full client buffer.

25. The method of claim 24, further comprising:
employing a token manager associated with the virtual smart card to interact with the server to negotiate encryption keys useable to encrypt the data stream as the data stream is streamed to the client device.

26. The method of claim 24, wherein the virtual smart card further comprises a token storage module that is configured to store at least one of the user information, the token, a URI, and the encryption keys.

27. An apparatus for receiving a data stream over a network, comprising:
- a means for requesting the data stream;
- a means for negotiating a token associated with the requested data stream, wherein the token is employable to enable the request to be validated to receive the data stream;
- a means for receiving the requested data stream if the request is valid, wherein the requested stream is encrypted;
- a means for providing a flow control metric associated with the received data stream; and
- a means for receiving the encrypted data stream in a controlled flow from a server, wherein the server is configured to employ the flow control metric, in part, to control the flow of the encrypted data stream over the network to maintain a substantially full buffer in the apparatus.

* * * * *

UNITED STATES PATENT AND TRADEMARK OFFICE
CERTIFICATE OF CORRECTION

PATENT NO.         : 7,299,292 B2                                      Page 1 of 1
APPLICATION NO.    : 10/957081
DATED              : November 20, 2007
INVENTOR(S)        : Morten et al.

It is certified that error appears in the above-identified patent and that said Letters Patent is hereby corrected as shown below:

On the Title page, Item -56-
On page 2, under "Other Publications", line 26, delete "Immage" and insert -- Image --, therefor.

On the Title page, Item -56-
On page 2, under "Other Publications", line 32, delete "Desing," and insert -- Design, --, therefor.

On Sheet 4 of 7, in Fig. 4, line 1 (Box. 420), delete "UI" and insert -- URI --, therefor.

On Sheet 5 of 7, in Fig. 5, line 1, (Box 710), delete "STEAM" and insert -- STREAM --, therefor.

In column 15, line 29, in Claim 11, delete "action," and insert -- actions, --, therefor.

Signed and Sealed this

Fifteenth Day of April, 2008

JON W. DUDAS
*Director of the United States Patent and Trademark Office*